United States Patent [19]

Selinger et al.

[11] Patent Number: 5,322,702
[45] Date of Patent: Jun. 21, 1994

[54] MICROGRANULAR PROTEIN OPACIFYING MATERIAL

[75] Inventors: Edward Selinger, Langhorne, Pa.; Thomas R. Laaman, Bordontown, N.J.

[73] Assignee: FMC Corporation, Philadelphia, Pa.

[21] Appl. No.: 898,628

[22] Filed: Jun. 15, 1992

[51] Int. Cl.$^5$ .............................................. A23J 1/20
[52] U.S. Cl. ..................................... 426/583; 426/589; 426/491; 426/613; 426/804; 426/657; 426/565; 426/576; 426/570
[58] Field of Search ............... 426/583, 804, 613, 589, 426/491, 65 P

[56] References Cited

U.S. PATENT DOCUMENTS

| | | | |
|---|---|---|---|
| 3,852,506 | 12/1974 | Burge | 426/453 |
| 4,045,589 | 8/1977 | Petrowki | 426/609 |
| 4,143,174 | 3/1979 | Shah et al. | 426/583 |
| 4,209,503 | 6/1980 | Shah et al. | 426/583 |
| 4,490,403 | 12/1984 | Pisecky | 426/453 |
| 4,734,287 | 3/1988 | Singer | 426/41 |
| 4,782,138 | 11/1988 | Rialland | 530/366 |
| 4,985,270 | 1/1991 | Singer | 426/515 |

FOREIGN PATENT DOCUMENTS 412590  2/1991  European Pat. Off. .

*Primary Examiner*—Jeanette Hunter
*Attorney, Agent, or Firm*—Norman L. Craig; Mark A. Greenfield; Anthony L. Cupoli

[57] ABSTRACT

There is disclosed an opacifying material of micrgranular protein opacifying material having a mean particle size distribution of 0.1 microns to 10 microns with fewer than 20% of the total number of particles exceeding 10 microns, which is prepared by wet milling denatured whey protein isolate.

20 Claims, No Drawings

MICROGRANULAR PROTEIN OPACIFYING MATERIAL

BACKGROUND OF INVENTION

1. Field of Invention

The present invention relates to opacifying materials. In particular this invention relates to water-dispersible microgranular protein opacifying materials which are suitable for use in food products, processes for their manufacture, and methods of use.

2. Statement of Related Art

Continuing public demand has led to ongoing efforts to develop new food products with suitable taste and appearance. A product which does not have an expected appearance may not even be purchased from a grocery shelf. Even if purchased, a product which imparts an unusual visual perception may be unfavorably received, even if its other organoleptic properties are acceptable. Duplication of opacity, creaminess, and whiteness is especially important in products which try to mimic cream and cream-like materials.

Titanium dioxide, which is a classic whitener for paints, can be a very effective opacifier and whitener for food products. Although considered safe in food products, titanium dioxide is an inorganic additive which by its very nature would be expected to find decreasing favor with greater public awareness of food additive contents.

Additionally, the brilliant whiteness of titanium dioxide is not necessarily desirable for mimicking the off-white creamy color desired for many food products. Resorting to artificial colors to correct this problem would be expected to compound the problem of public acceptance.

The use of opacifiers derived from protein materials would be expected to alleviate consumer acceptance problems especially if the materials are derived from readily identifiable and acceptable "natural" sources.

Singer, U.S. Pat. No. 4,734,287, discloses a proteinaceous water-dispersible macro-colloid comprising substantially non-aggregated particles of heat denatured whey protein coagulate having particle size distributions of about 0.1 microns to 2.0 microns. The macro-colloid may be produced by controlled or extent limited denaturation of whey protein concentrate with very high shear. The macro-colloid is suggested as I5 lacking utility for high temperature applications due to the extent limited denaturation. Singer additionally indicates that mechanical size reduction of proteins does not produce acceptable protein material for incorporation into food products.

Singer, U.S. Pat. No. 4,985,270, discloses food products containing proteinaceous water-dispersible macrocolloids, wherein a preferred protein is dairy whey.

Petrowski, U.S. Pat. No. 4,045,589, discloses a coffee whitener prepared without the use of protein by incorporating modified dextrinized starch in an aqueous emulsion containing fat or oil and a conventional emulsifier.

Burge, U.S. Pat. No. 3,852,506, discloses a dispersible whey protein composition prepared from demineralized and delactosed whey protein which is spray dried, and then ground in a hammermill or similar mill using hammer- or knife- milling action to obtain particles of which at least 55% are less than 44 microns. The particles are subsequently agglomerated.

Hakkaart, published European Patent Application No. 412590, discloses a heat denatured protein in the form of microcolloidal particles having a mean size in the o range of 0.1 to 10 microns in which the $\alpha$-lactalbumin to $\beta$-lactoglobuline ratio is greater than 0.43. The heat denatured protein is prepared by successively heating and concentrating whey protein concentrate at neutral pH.

Rialland, U.S. Pat. No. 4,782,138, discloses a process for separating $\alpha$-lactalbumim from whey by heat treating the whey at a pH less than 4 and recovering the precipitated $\alpha$-lactalbumin.

Pisecky, U.S. Pat. No. 4,490,403, discloses a process for spray drying whey and added fat.

SUMMARY OF THE INVENTION

This invention affords a microgranular protein opacifying material formed by wet milling denatured whey protein isolate, a material which is ultimately derived from milk. The opacifying material of this invention is thus ultimately derived from an acceptably natural source, and the isolate itself is an accepted food product. Additionally the opacifying material may be considered an "environmentally friendly" product since the starting material is whey, a by-product of the cheese industry which has historically presented significant environmentally acceptable disposal problems.

The microgranular protein opacifying material of this invention can be used to opacify liquids, solids, and dispersions with an effectiveness approaching that of titanium dioxide. This feature permits the use of smaller amounts of the opacifying material than would normally be required if another protein material were used, and thereby may not only reduce cost, but also reduce the possibility of interference with other organoleptic properties of the food product. Additionally this opacifying material can impart a desirable creamy white color to the food instead of the brilliant white of titanium dioxide. The opacifier may also be used at high temperatures which might preclude the use of other protein materials.

Opacifying Material Embodiments

In accordance with one embodiment of this invention there is provided a microgranular protein opacifying material having a mean particle size distribution of 0.1 microns to 10 microns with fewer than 20% of the total number of particles exceeding 10 microns. The opacifying material is formed by wet milling denatured whey protein isolate. Other denatured proteins such as egg albumen or soy protein may be used, but are less preferred.

In accordance with a second embodiment of this invention, an opacifying material is provided which is an aqueous dispersion of the microgranular protein opacifying material which comprises from 5% to 30% by weight of the dispersion and preferably from 15% to 25%.

In accordance with a third embodiment of this invention an opacifying material is provided comprising substantially spheroidal aggregated microgranular protein opacifying material, having a mean particle size distribution of 1 micron to 20 microns with fewer then 20% of the aggregates having a diameter exceeding 20 microns.

In accordance with a fourth embodiment of this invention an opacifying material of "coprocessed material" is provided comprising substantially spheroidal aggregates of microgranular protein opacifying material and one or more coprocessing materials which include a polysaccharide, oil, or fat. For purposes of this embodiment, the aggregates may contain 0.2% or more of the microgranular protein opacifying material, preferably at least 0.5%.

In accordance with a fifth embodiment of this invention, an opacifying material is provided which is an aqueous dispersion of the coprocessed material or the aggregated microgranular protein opacifying material comprising up to 35% by weight of the dispersion, preferably up to 20%, and more preferably from 5% to 10%.

Process for Fabricating Embodiments

Another group of embodiments are processes for fabricating opacifying materials of this invention.

One process embodiment for fabricating the microgranular protein opacifying material of this invention comprises wet milling denatured whey protein isolate under conditions effective to produce a substantial amount of microgranular protein opacifying material having particles of a mean size distribution of 0.1 microns to 10 microns with fewer than 20% of the particles exceeding 10 microns.

A second process embodiment for producing opacifying materials of this invention comprises the steps of:

a. wet milling denatured whey protein material isolate under conditions effective to produce a substantial amount of microgranular protein opacifying material having particles of a mean size distribution of 0.1 microns to 10 microns with fewer than 20% of the particles exceeding 10 microns; and b. spray drying the microgranular protein opacifying material.

A third process embodiment for producing opacifying materials of this invention comprises the steps of:

a. wet milling denatured whey protein isolate under conditions effective to produce a substantial amount of microgranular protein opacifying material having particles of a mean size distribution of 0.1 microns to 10 microns with fewer than 20% of the total of the particles exceeding 10 microns;

b. mixing the resulting microgranular protein opacifying material with at least one of a polysaccharide, oil or fat;

c. spray drying the mixture.

Opacifying Material Utility

The opacifying material of this invention may be incorporated into a food product as the microgranular protein opacifying material, aggregated microgranular protein opacifying material, coprocessed material, or aqueous dispersions thereof. The amount of opacifying material incorporated into the food product primarily depends on the characteristics desired. The microgranular protein opacifying material may comprise up to 20% of the food product, and preferably from 0.1% to 5%. Typical food products into which the opacifying materials of this invention may be incorporated include coffee whiteners, pourable salad dressings, spoonable salad dressings, frozen desserts, gelatine foods, whipped toppings, gravies, beverages, sauces and low fat milk. Food products which are preferred are coffee whiteners and salad dressings. The opacifying materials are also well suited for use in food products which must be heated to high temperatures, for example to oven temperatures of 200° F. to 450° F.

DETAILED DESCRIPTION OF THE INVENTION

Other than in the operating examples, or where otherwise indicated, all numbers expressing quantities of ingredients or reaction conditions used herein are to be understood as modified in all instances by the term "about". All percentages unless otherwise indicated are on a weight/weight basis.

As used herein, the terms "denatured whey protein isolate", "lactalbumin", and "isolate" refer to a mixture of water insoluble denatured dairy whey proteins. The denatured whey protein isolate typically has a dry weight lactose content of less than 20% and preferably less than 10%.

Denatured whey protein isolate may be prepared by a denaturing heat treatment of dairy whey at a pH close to the isoelectric point of the included proteins. Methods are well known in the art, for example see U.S. Pat. No. 4,711,953 and references cited therein. Suitable denatured whey protein isolate may be obtained commercially, for example Alatal® 825 lactalbumin, a product of New Zealand Milk Products, Santa Rosa, Calif.; or lactalbumin, which can be obtained from Sigma Chemical Company, St. Louis, Mo.

"Microgranular protein opacifying material" is an opacifying material produced by wet milling denatured whey protein isolate to a mean particle size distribution of 0.1 microns to 10 microns with fewer than 20% of the total number of particles exceeding 10 microns. Preferably the microgranular protein opacifying material has a mean particle size distribution of 0.3 microns to 3 microns with fewer than 20% of the total number of particles exceeding 3 microns. Microgranular protein opacifying material is further characterized in that more than 50% of the protein material will sediment from a 1% aqueous dispersion during a twelve hour period.

"Aggregated microgranular protein opacifying material" is an opacifying material obtained by spray drying microgranular protein opacifying material.

"Coprocessed material" is dry aggregate opacifying material obtained by spray drying microgranular protein opacifying material and at least one other material which is referred to as the "coprocessing material". Suitable coprocessing materials include polysaccharides, fats, and optionally hydrogenated oils. These coprocessing materials may serve as viscosity enhancing materials, gel forming materials, and barrier dispersants. Preferred coprocessing materials include xanthan gum, sodium alginate, locust bean gum, gum tragacanth, guar gum, agar, agarose, algin, carrageenan, curdlan, microcrystalline cellulose, gellan, sodium carboxymethylcellulose, fats, and optionally hydrogenated oils as well as chemical derivatives and physical modifications of the foregoing, and mixtures thereof. Oils which may be optionally hydrogenated include soybean, sunflower, olive, cottonseed, and peanut oils as well as other eatable oils. The microcrystalline cellulose is preferably of 60% to 90% colloidal content, preferably greater than 70%. Particular preferred coprocessing materials include Avicel® RCN-15 cellulose gel, a product of FMC Corporation which is 85 parts by weight of microcrystalline cellulose and 15 parts of guar gum; Avicel® RCN-10 cellulose gel, a product of FMC Corporation which is 90 parts by weight of microcrystalline cellulose and 10 parts Of guar gum; Avicel® CL-611 cellulose gel, a product of FMC Corporation which is 85 parts by weight of microcrystalline cellulose and 15 parts of sodium carboxymethylcellulose; and Kaomel® vegetable fat, a product of Van Den Bergh Corp., Lisle, Ill.

In a preferred mode the microgranular protein opacifying material is spray dried with at least one barrier dispersant such as Kaomel® vegetable fat or sodium carboxymethylcellulose. Preferably the barrier dispersant is between 1% to 15% of the microgranular protein opacifying material on a dry weight basis and more preferably between 5% and 10%.

The process for fabricating the microgranular protein opacifying material of this invention comprises controlled wet milling of denatured whey protein isolate. Suitable wet milling equipment is commercially available such as the DYNO-Mill KDL which is produced by W. A. Bachofen, Basel, Switzerland. Denatured protein isolate is fed to the mill as a 10% to 30% aqueous slurry, a slurry of 20% isolate is preferred. A suitable slurry may be obtained from the whey denaturing process or by dispersing a dry powder of denatured whey protein isolate in water. The particle size of the dispersed denatured whey isolate which is fed to the mill may range from about 50 microns to 200 microns, preferably from 20 microns to less than 100 microns.

Wet milling is conveniently conducted at a temperature below 60° C., preferably between room temperature and 30° C. The grinding chamber of the wet mill is preferably filled to a maximum of 85% capacity with a milling medium such as 23-30 mesh zirconium silicate grinding beads. The wet mill is advantageously operated at maximum shaft speed and slowest feed rate, the denatured whey protein isolate thereby having a residence time of one to three minutes. The dispersed microgranular protein opacifying material thus obtained may be used directly in the desired food product, or spray dried with or without a coprocessing material.

Spray drying may be performed with commercially available equipment using standard techniques known in the art. A 3 foot Stork-Bowen® spray dryer, obtained from Niro Corp., Sommerville, N.J., can be effectively used. Suitable inlet and outlet temperature ranges are 170° C. to 200° C., and 80° C. to 120° C. respectively. Typically a 1% to 20% dry weight aqueous dispersion of the microgranular protein opacifying material is fed to the dryer, a 10% dispersion is preferred. The feed rate of the dispersion is preferably 100 grams per minute.

The opacifying material of this invention, its fabrication, and uses are illustrated by the following non-limiting examples. Ingredient quantities in the illustrated formulations are in grams(g) unless otherwise specified.

EXAMPLE 1

Preparation of Microgranular Protein Opacifying Material

A 20% dispersion of Alatal® 825 lactalbumin in deionized water was milled in the following manner. The grinding chamber of a 1.5 liter ceramic-lined DYNO-Mill KDL apparatus was filled to 85% capacity with 20-30 mesh zirconium silicate beads and the remainder of the volume was filled with deionized water. The dispersion of Alatal® 825 lactalbumin was then pumped into the mill which was operated at medium shaft speed. The first 1.5 liters of microgranular protein opacifying material were discarded due to dilution by water which had been initially added to the grinding chamber. The product thereafter, which had the appearance of whipped cream, was used in the following examples.

EXAMPLE 2

Physical Properties of Protein Materials

The Brookfield viscosity of a 20% aqueous dispersion of Alatal® 825 lactalbumin before milling was 40 cps as measured using a Brookfield Viscometer, (Brookfield Engineering Laboratories, Inc., Stoughton, Mass.) at 25° C. with the #1 spindle at 100 rpm. A 20% dispersion of microgranular protein opacifying material as produced in Example 1 had a viscosity of 40,000 cps as measured with the #4 spindle at 2 rpm.

The particle size distribution of the microgranular protein opacifying material was measured using a Horiba Particle Size Distribution Analyzer, Model CAPA-700, obtained from Horiba Ltd, Kyoto, Japan. The following particle size distribution was determined:

| Particle Size Range (microns) | Percentage |
|---|---|
| >8.40 | 0 |
| 7.80-8.10 | 5.8 |
| 6.90-7.80 | 0 |
| 6.00-6.90 | 1.5 |
| 5.10-6.00 | 1.1 |
| 4.20-5.10 | 1.5 |
| 3.30-4.20 | 1.4 |
| 2.40-3.30 | 2.9 |
| 1.80-2.40 | 5.8 |
| 1.50-1.80 | 6.3 |
| 1.20-1.50 | 16.2 |
| 0.90-1.20 | 23.8 |
| 0.60-0.90 | 18.2 |
| 0.30-0.60 | 12.5 |
| <0.30 | 3.0 |

The median particle size was 1.11 microns.

EXAMPLE 3

Opacity Comparison of Various Materials

The relative opacities of 4% aqueous dispersions of various opacifying materials were determined on a subjective basis. An opacity scale was initially developed wherein a 4% suspension of titanium dioxide was assigned an opacity rating of ten, and a 4% dispersion of undenatured whey protein isolate was assigned a rating of zero. Four per-cent aqueous dispersions were prepared of Simplesse® microparticulated denatured whey protein concentrate, denatured egg white, casein, undenatured whey protein concentrate, undenatured whey protein isolate, Aquacoat® ethyl cellulose latex, and microcrystalline cellulose. These dispersions were physically placed between the two standards in order of increasing opacity and assigned subjective opacity ratings. The opacity rating of the microgranular protein opacifying material of this invention was considerably higher than the other proteinaceous materials and only slightly less than the opacity rating of titanium dioxide.

| Opacifying material | Particle Size | Opacity Rating |
|---|---|---|
| titanium dioxide | 0.5-1 | 10.0 |
| MPOM[1] | 0.5-1 | 9.0 |
| m-DWPC[2,3] | 0.1-0.5 | 5.0 |
| denatured egg white | 2-5 | 6.0 |
| ethyl cellulose latex[4] | 0.2-0.5 | 6.0 |

| Opacifying material | Particle Size | Opacity Rating |
| --- | --- | --- |
| casein | 10–20 | 6.0 |
| MCC[5] | 6–15 | 5.0–6.0 |
| WPC[6] | es[7] | 0.0 |
| WPI[8] | es[7] | 0.0 |

[1] microgranular protein opacifying material
[2] microparticulated denatured whey protein concentrate
[3] Simplesse ®, Nutrasweet, Corp.
[4] Aquacoat ® ethyl cellulose latex, FMC Corp., Newark, Del.
[5] Avicel ® microcrystalline cellulose, PH-101, FD-100 and NT-006 grades, FMC Corp. Newark, Del.
[6] whey protein concentrate, Clofine Co., Linwood, N.J.
[7] essentially solubilized
[8] whey protein isolate, LeSeur Co., LeSeur, Minn.

EXAMPLE 4

Coprocessed Microgranaular Protein Opacifying Material/Sodium Carboxymethylcellulose A 4275 gram sample of microgranular protein opacifying material as obtained in Example 1 (i.e. 20% solids) was mixed for 40 minutes with 46.9 grams of sodium carboxymethylcellulose in a colloid mill. The colloid mill, obtained from Grerco Co., Hudson, N.H., was set at a 10 mil clearance with the rotor operating at a rheostat setting of 62.5 hz. The resulting slurry was passed through a model 15M Manton Gaulin homogenizer (obtained from Gaulin Corp., Everett, Mass.) at 2500 psi. The homogenized slurry was then spray dried using a 3-foot Stork Bowen spray drier having a 0.1 inch diameter atomization nozzle opening. The slurry was fed to the spray dryer by means of a model 55R variable feed Moyno pump, obtained from Robbins Meyers, Springfield, Ohio. The operating inlet and outlet temperatures of the spray dryer were 177° C. and 110° C. respectively. A powder of substantially spheroidal microgranular protein opacifying material-sodium carboxymethylcellulose particles was produced. The particles ranged in size from about 20 microns to about 30 microns. This co-processed powder was subsequently slurried for thirty minutes into deionized water under moderate shear conditions using a model RZR50 Lightin' Mixer (Caframo Co., Wiarton, Canada) operated at 1300 rpm. Upon completion, the aggregates had disintegrated, producing a suspension of particles having a size distribution similar to that of the microgranular protein opacifying material.

A second co-processed mixture was prepared in the manner described above, using 10 parts by weight of sodium carboxymethylcellulose and 90 parts of microgranular protein opacifying material as obtained from Example 1. This mixture was also spray-dried, producing aggregates similar to those described above. The aggregates upon being slurried into deionized water, dispersed readily into particles having a size distribution similar to that of the microgranular protein opacifying material.

EXAMPLE 5

Coprocessed Microgranular Protein Opacifying Material/Cellulose Gel

Twenty-five parts of microgranular protein opacifying material as produced in Example 1 was mixed in a colloid mill with 75 parts by weight of Avicel ® RCN-15 cellulose gel. The dispersion was then spray-dried as in Example 4. When this dried material was redispersed in deionized water, the opacity of this dispersion was greater than the opacity of a similar suspension of Avicel ® RCN-15 in water, showing that the microgranular protein opacifying material had contributed significantly to the opacity.

EXAMPLE 6

Coprocessed Microgranular Protein Opacifying Material/Vegetable Fat

Kaomel ® vegetable fat was emulsified with 0.5% Tanden 22H emulsifier, a product of Witco Corp., Newark, N.J. One part of the Kaomel ® vegetable fat/emulsifier mixture and nine parts of microgranular protein opacifying material were mixed in a colloid mill and spray dried as in Example 4. The dry powder was redispersed in deionized water under moderate shear, producing a suspension having a particle size distribution essentially identical with the microgranular protein opacifying material of Example 1. This redispersed material had a noticeably greater opacity than either the microgranular protein opacifying material or a dispersion of Kaomel ® fat separately.

EXAMPLE 7

Liquid Coffee Whitener Formulations

Liquid coffee whitener formulations (A, B, C) were prepared from the following ingredients:

| Ingredients | A (g) | B (g) | C (g) |
| --- | --- | --- | --- |
| deionized water | 847.5 | 847.5 | 803.0 |
| corn syrup | 100.0 | 100.0 | 125.0 |
| DWPI[1] | 40.0 | — | — |
| MPOM[2] | — | 40.0 | 50.0 |
| cellulose gel[3] | 10.0 | 10.0 | 20.0 |
| dipotassium phosphate | 2.5 | 2.5 | 2.0 |

[1] denatured whey protein isolate; ALATAL ® 825 lactalbumin
[2] microgranular protein opacifying material
[3] Avicel ® RCN-15 cellulose gel - 85% microcrystalline cellulose - 15% guar gum The dipotassium phosphate and the Avicel ® RCN-15 cellulose gel were mixed into 400 mL of deionized water using a Waring blendor for 10 minutes. The Alatal ® 825 lactalbumin or microgranular protein opacifying material was then added to this mixture and mixing was continued for another minute. The corn syrup was then added followed by mixing for one minute, after which the entire mixture was poured into a stainless steel container. The remaining deionized water was added while the mixture was being stirred at 1300 rpm with a propeller-type stirrer. The mixture was then heated to 65° C. and held at this temperature for 10 minutes with continued stirring. The hot mixture was then run through a two-stage homogenizer, the first stage operating at 2500 psi and the second stage at 500 psi. After homogenization, the mixture was cooled to 4° C.

Evaluation of these formulations was done visually by mixing each formulation with coffee in a 1:9 ratio (volume/volume) of whitener/coffee. Formulation B in comparison with Formulation A imparted a distinctly lighter color to the coffee. Formulation B possessed good stability over time, whereas after two minutes Formulation A imparted a mottled appearance to the surface of the coffee. In comparison with a commercial 5% fat nondairy creamer which imparted a similar color to the coffee, Formulation B was noticeably more stable and did not form a creamy layer on the surface of the coffee. Formulation C in comparison with Formulation B provided a richer creamier appearance to the coffee, and the formulation itself had a rich, creamy body.

EXAMPLE 8

Spoonable Salad Dressing Formulations

Spoonable salad dressing formulations (D,E) were prepared from the following ingredients:

| Ingredients | D (g) | E (g) |
| --- | --- | --- |
| deionized water | 652.9 | 637.9 |
| vinegar | 90.0 | 90.0 |
| sucrose | 65.0 | 65.0 |
| starch (purity 420) | 45.0 | 45.0 |
| corn syrup | 35.0 | 35.0 |
| celluose gel[1] | 30.0 | 30.0 |
| MPOM[2] | — | 25.0 |
| vegetable oil | 30.0 | 30.0 |
| lemon juice | 20.0 | 20.0 |
| salt | 15.0 | 15.0 |
| xanthan gum | 5.0 | 5.0 |
| mustard powder | 5.0 | 5.0 |
| sodium benzoate | 1.0 | 1.0 |
| Polysorbate 60 surfactant | 1.0 | 1.0 |
| EDTA | 0.1 | 0.1 |
| 36 carotene solution #2 | 2 drops | 2 drops |
| 18 Baker's Egg Shade 8038 | 1 drop | 1 drop |

[1]Avicel ® RCN-15 cellulose gel - 85% microcrystlline cellulose - 15% guar gum
[2]microgranular protein opacifying material In a Waring blendor operated at high speed were placed the Avicel ® RCN-15 cellulose gel and one-half of the deionized water. At this point the microgranular protein opacifying material as obtained from Example 1 was also introduced into Formulation E. After being mixed for 15 minutes, the resulting dispersion was transferred to a mixing bowl. The starch which had been cooked at 85° C. for 5 minutes in the remainder of the deionized water was added to the bowl, and the contents were mixed for 5 minutes using a Hobart ® mixer obtained from Hobart Corp., Troy, Ohio. A dry blend of the sucrose, xanthan gum, sodium benzoate, and ethylenediaminetetraacetic acid disodium salt (EDTA) was prepared. This dry mixture was added simultaneously with the corn syrup, and mixing was continued for 5 minutes. The vegetable oil and the Polysorbate 60 surfactant were heated together until the latter material was dissolved in the oil. This solution was added to the bowl, the contents of which were mixed for 5 minutes. After the salt and mustard powder had been blended in the dry state, this mixture was added to the bowl, and mixing was continued for an additional five minutes. The vinegar and lemon juice were added next with mixing for 5 minutes. Finally, the coloring agents were added and mixed for 5 minutes. The mixture was then homogenized at 1000 psi. Formulation E appeared creamier and much more opaque than Formulation D. The two formulations were similar in gloss, shine, and smoothness. These assessments were made visually by spreading each formulation as a thin layer on a black surface.

EXAMPLE 9

Pourable French-Style Salad Dressing Formulations

Pourable, French-style salad dressings were prepared from the following formulations:

| Ingredients | F (g) | G (g) |
| --- | --- | --- |
| deionized water | 1047.43 | 972.43 |
| sucrose | 135 | 135 |
| vinegar | 127.5 | 127.5 |
| lemon juice | 67.5 | 67.5 |
| cellulose gel[1] | 15.0 | 15.0 |
| MPOM[2] | — | 75.00 |
| MCC/NaCMC[3] | 30.0 | 30.0 |
| tomato paste | 30.0 | 30.0 |
| sodium chloride | 22.5 | 22.5 |
| soybean oil | 6.75 | 6.75 |
| xanthan gum | 6.0 | 6.0 |
| mustard powder | 6.0 | 6.0 |
| onion powder | 2.25 | 2.25 |
| garlic powder | 0.75 | 0.75 |
| Polysorbate 60 | 0.75 | 0.75 |
| oleoresin paprika | 0.20 | 0.20 |
| oleoresin tumeric | 0.08 | 0.08 |

[1]Avicel ® RCN-15 cellulose gel - 85% microcrystalline cellulose - 15% guar gum.
[2]microgranular protein opacifying material
[3]Avicel ® CL-611 cellulose gel, 85% microcrystalline cellulose - 15% sodium carboxymethylcellulose All of the deionized water was mixed with the Avicel ® CL-611 cellulose gel in a Waring blendor operating at high speed for a 10 minute period. The Avicel ® RCN-15 cellulose gel and the microgranular protein opacifying material were then added to the dispersion of Avicel ® CL 611 cellulose gel in water and mixed for an additional 15 minutes. This mixture was then transferred to a large beaker, and mixing was continued using a LIGHTNIN' ® mixer. After premixing the xanthan gum and the sucrose, this dry mixture was added to the contents of the beaker, and the resulting mixture was mixed for 10 minutes. The soybean oil, oleoresins, and Polysorbate 60 surfactant were also premixed, and the mixture was added to the beaker and mixed for 5 minutes. The sodium chloride was dissolved in the vinegar. This solution was added to the beaker and was followed immediately by the addition of the remaining ingredients. The complete formulation was mixed for 10-15 minutes before being passed through a colloid mill with at a gap setting of 0.01 inch. Visual inspection determined that Formulation G was definitely more opaque than Formulation F, and Formulation G appeared to be more creamy. The greater opacity of Formulation G contributed to a somewhat lighter color of the salad dressing.

EXAMPLE 10

Vanilla Flavored Frozen Dessert Formulations

Vanilla flavored frozen dessert formulations were prepared in the following manner.

| Ingredients | H (g) | I (g) |
| --- | --- | --- |
| condensed skim milk | 2238.95 | 2238.95 |
| deionized water | 461.65 | 111.65 |
| sugar | 420.00 | 420.00 |
| MPOM[1] | — | 350.00 |
| corn syrup | 218.75 | 218.75 |
| light cream (18% fat) | 97.30 | 97.30 |
| cellulose gel[2] | 52.30 | 52.30 |
| xanthan gum | 6.30 | 6.30 |
| cream flavoring[3] | 3.50 | 3.50 |
| carrageenan | 1.05 | 1.05 |

[1]microgranular protein opacifying material
[2]Avicel ® RCN-10 cellulose gel - 90% microcrystlline cellulose and 10% guar gum
[3]Allkream III cream flavoring. Alko Research Int., Roggel, Holland The condensed skim milk, deionized water, microgranular protein opacifying material, corn syrup, cream, and ALLKREAM III cream flavoring were combined in a beaker while being heated in a water bath and mixed with a LIGHTNIN' ® mixer. Meanwhile, the sugar, Avicel ® RCN-10 cellulose gel, xanthan gum, and carrageenan were dry blended before being added to the combined liquids. The resulting mixture was heated at 71° C. for 30 minutes to pasteurize it. The mixture was then passed through a two-stage homogenizer, operating the first stage at 2000 psi and the second stage at 500 psi and then cooled to 4° C. with agitation. After cooling was complete, the mixture was aged overnight in a refrigerator. Before the mixture was frozen, 5 mL of vanilla flavoring was added. Frozen Formulation I was visually rated and was described as having greater opacity than Formulation H.

What is claimed is:

1. An opacifying material comprising microgranular protein opacifying material having a mean particle size distribution of 0.1 microns to 10 microns with fewer than 20% of the total number of particles exceeding 10 microns, prepared by wet milling denatured whey protein isolate.

2. The opacifying material of claim 1 wherein the microgranular protein opacifying material has a mean particle size distribution of 0.3 microns to 3 microns with fewer than 20% of the total number of particles exceeding 3 microns.

3. The opacifying material of claim 1 wherein the denatured whey protein isolate is characterized by a lactose content of less than about 20% on a dry weight basis.

4. The opacifying material of claim 3 wherein the denatured whey protein isolate is characterized by a lactose content of less than about 10% on a dry weight basis.

5. An opacifying material comprising an aqueous dispersion of the microgranular protein opacifying material of claim 1.

6. An opacifying material comprising substantially spheroidal aggregates of the microgranular protein opacifying material of claim 1, the aggregates having a mean particle size distribution of 1 micron to 20 microns with fewer than 20% of the total number of aggregates exceeding 20 microns.

7. An opacifying material comprising aggregates of claim 6 wherein the aggregates have a mean particle size distribution of 1 micron to 10 microns with fewer than 20% of the total number of aggregates exceeding 10 microns.

8. An opacifying material comprising substantially spheroidal aggregates of the microgranular protein opacifying material of claim 1 and at least one coprocessing material.

9. The opacifying material of claim 8 wherein the coprocessing material is selected from a polysaccharide, an optionally hydrogenated oil, and a fat.

10. The opacifying material of claim 9 wherein the coprocessing material is selected from at least one of xanthan gum, sodium alginate, locust bean gum, gum tragacanth, guar gum, agar, agarose, algin, carrageenan, curdlan, gellan, microcrystalline cellulose, and sodium carboxymethylcellulose.

11. The composition of claim 9 wherein the oil is selected from soybean oil, sunflower oil, olive oil, cottonseed oil, and peanut oil.

12. A food product containing from 0.1% to 20% on a dry weight basis of the microgranular protein opacifying material of claim 1.

13. A food product containing from 0.5% to 5% on a dry weight basis of the microgranular protein opacifying material of claim 1.

14. A food product of claim 12, wherein the food product is selected from coffee whiteners, frozen desserts, pourable salad dressings, spoonable salad dressings, gelatine foods, whipped toppings, gravies, beverages, and sauces and low fat milk.

15. A food product of claim 14 wherein the food product is a coffee whitener.

16. A coffee whitener of claim 15 comprising microgranular protein opacifying material, microcrystalline cellulose, and guar gum.

17. A food product of claim 14 wherein the food product is a salad dressing.

18. A process comprising wet milling denatured whey protein isolate under conditions effective to produce a substantial amount of microgranular protein opacifying material having a mean particle size distribution of 0.1 microns to 10 microns with fewer than 20% of the total number of particles exceeding 10 microns.

19. A process comprising the steps of:
  a. wet milling denatured whey protein material isolate under conditions effective to produce a substantial amount of microgranular protein opacifying material having a mean particle size distribution of 0.1 microns to 10 microns with fewer than 20% of the particles exceeding 10 microns; and
  b. spray drying the microgranular protein opacifying material.

20. A process comprising the steps of:
  a. wet milling denatured whey protein material isolate under conditions effective to produce a substantial amount of microgranular protein opacifying material having a mean particle size distribution of 0.1 microns to 10 microns with fewer than 20% of the particles exceeding 10 microns;
  b. mixing the microgranular protein opacifying material with at least one of a polysaccharide, a fat, or an optionally hydrogenated oil; and
  c. spray drying the mixture.

* * * * *